United States Patent
Hausmair et al.

(10) Patent No.: US 10,153,793 B2
(45) Date of Patent: Dec. 11, 2018

(54) APPARATUS AND METHOD FOR IDENTIFICATION AND COMPENSATION OF DISTORTION IN A MULTI-ANTENNA SYSTEM

(71) Applicant: Telefonaktiebolaget LM Ericsson (publ), Stockholm (SE)

(72) Inventors: Katharina Hausmair, Göteborg (SE); Thomas Eriksson, Göteborg (SE); Christian Fager, Mölnlycke (SE); Ulf Gustavsson, Göteborg (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/577,840

(22) PCT Filed: May 17, 2016

(86) PCT No.: PCT/EP2016/061001
§ 371 (c)(1),
(2) Date: Nov. 29, 2017

(87) PCT Pub. No.: WO2017/198288
PCT Pub. Date: Nov. 23, 2007

(65) Prior Publication Data
US 2018/0167092 A1    Jun. 14, 2018

(51) Int. Cl.
*H04B 1/62* (2006.01)
*H04B 1/04* (2006.01)
(Continued)

(52) U.S. Cl.
CPC ......... *H04B 1/0475* (2013.01); *H04B 1/0483* (2013.01); *H04L 25/03343* (2013.01);
(Continued)

(58) Field of Classification Search
CPC .... H03F 1/3241; H03F 1/3247; H03F 1/3253; H04B 1/0475; H04B 1/0483; H04L 27/367
(Continued)

(56) References Cited

U.S. PATENT DOCUMENTS

| 2012/0328050 | A1 | 12/2012 | Bai et al. |
| 2015/0085634 | A1 | 3/2015 | Yu et al. |
| 2017/0214438 | A1* | 7/2017 | Ghannouchi ..... H04L 25/03343 |

OTHER PUBLICATIONS

Bassam, S. et al., "Crossover Digital Predistorter for the Compensation of Crosstalk and Nonlinearity in MIMO Transmitters", IEEE Transactions on Microwave Theory and Techniques, May 2009, pp. 1119-1128, vol. 57, No. 5.
(Continued)

*Primary Examiner* — Kevin Kim
(74) *Attorney, Agent, or Firm* — Coats & Bennett, PLLC

(57) ABSTRACT

The disclosure relates to devices, methods, and computer programs in mobile communications in order to reduce signal distortions. Specifically, it relates to a transmitter system which comprises a plurality of signal paths. Each signal path is associated with an input transmission signal. Each signal path comprises an analog portion of the signal path. Each 5 signal path comprises a Dual-Input Digital Predistortion, DI DPD, module. The DI DPD is configured to provide a predistorted input transmission signal to the analog portion in response to a received Crosstalk and Mismatch, CTM, signal and the input transmission signal. The transmitter system further comprises one or more CTM modules configured to receive one or more input transmission signals. The CTM module comprises to separately generate for 10 each DI DPD module the CTM signal, where said CTM signals represent CTM distortions caused by one or more output transmission signals of each said analog portion.

31 Claims, 10 Drawing Sheets

(51) Int. Cl.
*H04L 25/03* (2006.01)
*H04B 7/06* (2006.01)
(52) U.S. Cl.
CPC .............. *H04B 7/06* (2013.01); *H04B 7/0639* (2013.01); *H04B 2001/0425* (2013.01)
(58) Field of Classification Search
USPC ........................................................ 375/296
See application file for complete search history.

(56) References Cited

OTHER PUBLICATIONS

Amin, S. et al., "Behavioral Modeling and Linearization of Crosstalk and Memory Effects in RF MIMO Transmitters", IEEE Transactions on Microwave Theory and Techniques, Apr. 2014, pp. 810-823, vol. 62, No. 4.

Fager, C. et al., "Prediction of Smart Antenna Transmitter Characteristics Using a New Behavioral Modeling Approach", 2014 IEEE MTT-S International Microwave Symposium (MS), Jun. 1-6, 2014, pp. 1-4, Tampa, US.

Zhang, Z. et al., "An Improved Cross Talk Cancelling Digital Predistortion for MIMO Transmitters", Mobile Information Systems, Mar. 3, 2016, pp. 1-8,Hindawi Publishing Corporation, vol. 2016, Article ID 5626495.

Suryasarman, P. et al., "A Comparative Analysis of Adaptive Digital Predistortion Algorithms for Multiple Antenna Transmitters", IEEE Transactions on Circuits and Systems—I: Regular Papers, May 2015, pp. 1412-1420, vol. 62, No. 5.

* cited by examiner

APPARATUS AND METHOD FOR IDENTIFICATION AND COMPENSATION OF DISTORTION IN A MULTI-ANTENNA SYSTEM

TECHNICAL FIELD

The present disclosure relates to apparatuses and methods for reduction of distortions in a multi-antenna system. In particular it relates to multi-antenna systems comprising a dual-input digital predistorter.

BACKGROUND

In radio communication, Multiple Input Multiple Output, MIMO, is a method for multiplying the capacity of a radio link using multiple transmit and receive antennas to e.g. exploit multipath propagation or provide for line of sight communication. MIMO has become an essential element of wireless communication standards including IEEE 802.11n, IEEE 802.11ac, HSPA+, WiMAX, and Long Term Evolution and Long Term Evolution Advanced and recently 5G, where massive MIMO is incorporated. Massive MIMO comprises a very large number of antennas (e.g., hundreds or thousands) that are operated fully coherently and adaptively. However, a setback is the different distortions introduced to the transmission signals of the antennas.

Different ways of reducing certain distortions, i.e., crosstalk that take place before the power amplifiers, are addressed in e.g. "An Improved Cross Talk Cancelling Digital Predistortion for MIMO Transmitters" (Zhang, Z., Shen, Y., Shao, S., Pan, W., & Tang, Y. (2016). *Mobile Information Systems,* 2016.), where a digital predistorter, DPD, utilizing an estimating technique and a decoupling technique is proposed, whereas in "A Comparative Analysis of Adaptive Digital Predistortion Algorithms for Multiple Antenna Transmitters" (Suryasarman, P. M., & Springer, A. (2015). *Circuits and Systems I: Regular Papers, IEEE Transactions on,* 62(5), 1412-1420.), the distortion issue is addressed by utilizing adaptive algorithms in the predistortion process.

In view of the vast interest of getting a reliable, fast and increased information-carrying communication system by utilizing MIMO antenna systems, it is desirable to obtain solutions that reduce the distortion of the transmission signals.

SUMMARY

In the present disclosure a transmitter system and methods are presented that provides for an alternative way of compensating for distortions of a transmission signal in a multi-antenna system.

According to aspects a transmitter system for transmitting input transmission signals on respective antenna ports is disclosed. The transmitter system comprises a plurality of signal paths. Each signal path comprises an input node for receiving an input transmission signal. Each signal path is further comprising an analogue portion of the signal path connected to an antenna port, where said antenna port is associated with a multi-antenna array. Each signal path is further comprising a Dual-Input Digital Predistortion, DI DPD, module coupled to the input node and the analogue portion of the signal path. The DI DPD is configured to provide a predistorted input transmission signal to the analogue portion of the signal path in response to a received Crosstalk and Mismatch, CTM, signal and the input transmission signal. The transmitter system further comprises one or more Crosstalk and Mismatch, CTM, modules configured to receive one or more input transmission signals. The CTM module is further configured to separately generate for each DI DPD module the CTM signal, where said CTM signals represent CTM distortions caused by one or more output transmission signals of each said analogue portion of the signal path. In this way the number of input signals to the digital-pre distorter is reduced, hence DI-DPDs can be utilized. That is, the system compensates for distortions introduced in the analogue portion of the signal path in an integrated and less-complex manner.

According to some aspects the CTM distortions for each signal path are caused by one or more portions of one or more output transmission signals at an output of each said analogue portion of the signal path. Moreover, each CTM signal is generated in response to all input transmission signals and a representative model of said CTM distortions. Hence, a representative model that describes the relation of the CTM signal of each path to the output signals of all signal paths is provided and it gives the skilled person a higher flexibility to adapt the system to a real situation.

According to some further aspects, the CTM distortions for each signal path are caused by one or more antenna crosstalks between respective output transmission signals and one or more other output transmission signals and/or circuitry mismatches at the output of respective analogue portion of the signal path. That is, the transmitter system provides for compensation, for each specific signal path of antenna crosstalk between the antenna elements of a multi-port antenna and the circuitry mismatches at the output of said specific signal path.

According to some further aspects regarding the CTM module, the CTM module is configured to separately generate the CTM signals for each DI DPD module based upon a linear system having the input transmission signals as input parameters. In this way, a linear model is provided that describes the relation between the CTM signals and the output signals of all signal paths which makes it easy to implement. A linear model allows for an efficient implementation.

According to some further aspects regarding the CTM module, the CTM module is configured to separately generate the CTM signals for each DI DPD module based upon S-parameters of the multi-antenna array. Alternatively, the CTM module is configured to separately generate the CTM signals for each DI DPD module based upon linear filter functions. This enables the skilled person to configure the CTM module in various ways and linear filter functions provides for a description of the coupling characteristics over a large frequency range.

According to even further aspects regarding the CTM module, the CTM module is configured to comprise a plurality of periodically updated CTM coefficients, said coefficients being applied to separately generate the CTM signals for each DI DPD module. The periodic update enables a feedback system capable of compensating time varying distortions, i.e., the compensation result of the system is improved. The distortions can for example be time-dependent impedance mismatch at the antenna port or antenna crosstalk.

The plurality of periodically updated CTM coefficients can according to some further aspects be forwarded from a CTM identification module where the CTM coefficients are identified in response to each of the predistorted input transmission signals provided by each of the DI DPD modules and each of the output transmission signals at the output of the analogue portion of the signal path. An advantage of having periodically updated CTM coefficients is that the system can compensate for time-variant CTM distortions and thereby achieve a more accurate predistortion of the signals. Moreover, by utilizing a CTM identification module there is no requirements of prior knowledge of either the PAs or the antenna array.

According to some aspects regarding the DI DPD modules, each of the DI DPD modules is configured to predistort the input transmission signal based on one or more entries in a DI DPD Look Up Table stored in respective DI DPD module. Moreover, the one or more entries are selected in response to the individual CTM signal and said input transmission signal. Alternatively, each of the DI DPD modules is configured to predistort the input transmission signal based on a DI DPD transfer function. Moreover, the DI DPD transfer function, may in regard to some aspects, comprises one or more of a Volterra series-based bivariate polynomial, a neural network predistorter, and/or a radial-basis function-based predistorter. This enables the skilled person to configure and implement the DI DPD modules in various ways.

According to further aspects regarding the DI DPD, each signal path of the transmitter system may further comprise a DI DPD identification module configured to periodically update entries of each DI DPD LUT of each DI DPD module and/or DI DPD coefficients of each DI DPD transfer function of each DI DPD module in response to each of the predistorted input transmission signals provided by each of the DI DPD modules and each of the output transmission signals at the output of the analogue portion of the signal path. Hence, it is provided for a feedback system where real time variations of the distortions can be compensated for which improves the compensation for distortions. According to even further aspects, each DI DPD identification module is further configured to periodically update the entries of the DI DPD LUT and/or DI DPD coefficients in response to each of the CTM signals. An advantage is that the feedback systems of the DI DPDs are able to consider CTM distortions which enable the system to better minimize the influence of distortions.

According to further aspects each antenna port of the transmitter system comprises an antenna element.

According to even further aspects the analogue portions of the signal paths comprises one or more of a radio frequency digital analogue converter, a power amplifier, a mixer, a filter, Digital Up Converter, a local oscillator, and a matching network.

According to some aspects, the present disclosure also relates to a radio network node comprising a baseband module and one or more transmitter systems. According to further aspects the present disclosure also relates to a wireless communication device comprising a baseband module and one or more transmitter systems. Thereby, the same advantages and benefits are obtained as for the transmitter system by itself.

According to some aspects, the present disclosure also relates to a method for identification and compensation of distortion, caused in a plurality of signal paths, each one comprising an analogue portion of the signal path. The method comprises providing a plurality of input transmission signals. It also comprises generating a plurality of CTM signals representing CTM distortions caused by one or more output transmission signals of each said analogue portion of the signal path. The method further comprises predistorting each of the input transmission signals in response to the respective input transmission signal and the respective CTM signal. The method further comprises applying each of the predistorted input transmission signals to a respective one of the analogue portion of the signal path to provide a plurality of output transmission signals at an output of each said analogue portion of the signal path. Thus, there is provided herein a method for identification and compensation of distortion. The same advantages and benefits are obtained as for the corresponding features of the previously discussed transmitter system.

According to some aspects the method comprises providing a representative model of CTM distortions. Moreover, the CTM distortions for each signal path are caused by one or more portions of one or more of a plurality of output transmission signals at an output of each said analogue portion of the signal path. Furthermore, the generating of a plurality of CTM signals is in response to the representative model of CTM distortions and all input transmission signals.

According to some further aspects regarding the method, the CTM distortions for each signal path are caused by one or more antenna crosstalks between respective output transmission signals and one or more other output transmission signals and/or circuitry mismatches at the output of respective analogue portion of the signal path.

According to some further aspects the method further provides a linear system as a representative model of the CTM distortions.

According to some further aspects the method further provides S-parameters of a multi-antenna array connected to the analogue portions of the signal paths, as being comprised in the representative model of the CTM distortions. Alternatively, the method provides linear filter functions, as being comprised in the representative model of the CTM distortions.

According to some further aspects regarding the method, the model of CTM distortions further comprises CTM coefficients and the method further comprises updating CTM coefficients periodically. According to further aspects, the step of updating may further comprises updating the CTM coefficients in response to each of the predistorted input transmission signals and each of the output transmission signals at the output of the analogue portions of the signal paths.

According to some further aspects the method further provides a DI DPD transfer function wherein the step of predistorting of the input transmission signal is based on the transfer function utilizing one or more of a Volterra series-based bivariate polynomial, a look up table, a neural network predistorter, and/or a radial-basis function-based predistorter. Alternatively, the method further provides a DI DPD Look Up Table, LUT, wherein the step of predistorting of the input transmission signal is based on one or more entries in the DI DPD LUT, wherein the one or more entries are selected in response to the individual CTM signal and the input transmission signal. Moreover, according to some further aspects the predistorting step further comprises updating DI DPD coefficients of the DI DPD transfer function and/or entries of the DI DPD LUT periodically in response to each of the predistorted input transmission signals and each of the output transmission signals at the output of the analogue portion of the signal path. According to even further aspects, the step of updating may further comprises updating the DI DPD coefficients and/or entries of the DI DPD LUT periodically in response to each of the CTM signals.

According to some aspects, the present disclosure also relates to a computer program comprising computer program code which, when executed in a communication device, causes the communication device to execute a method according to any of the claims 17-27. In addition, there are provided herein computer programs, comprising computer readable code which, when run on an apparatus, causes the apparatus to perform any of the methods disclosed herein. The computer programs of the transmitter system, the radio network node, the wireless communication device, and the predistortion device all display advantages corresponding to the advantages already described in relation to the respective methods disclosed above.

According to some aspects, the present disclosure also relates to a predistortion device for identification and compensation of distortion, caused in a plurality of signal paths, each one comprising an analogue portion of the signal path. The predistortion device comprises an input module arranged to provide a plurality of input transmission signals, a CTM generator module arranged to generate a plurality of CTM signals representing CTM distortions caused by one or more output transmission signals of each said analogue portion of the signal path. The device further comprises a predistorter module arranged to predistort each of the input transmission signals in response to the respective input transmission signal and the respective CTM signal. The predistorter module is arranged to apply each of the predistorted input transmission signals to a respective one of the analogue portion of the signal path. Thus, there is provided herein a predistortion device for identification and compensation of distortion. The same advantages and benefits are obtained as for the corresponding features and steps of the previously discussed transmitter system and method for identification and compensation of distortion, respectively.

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

DETAILED DESCRIPTION

Figure 1:
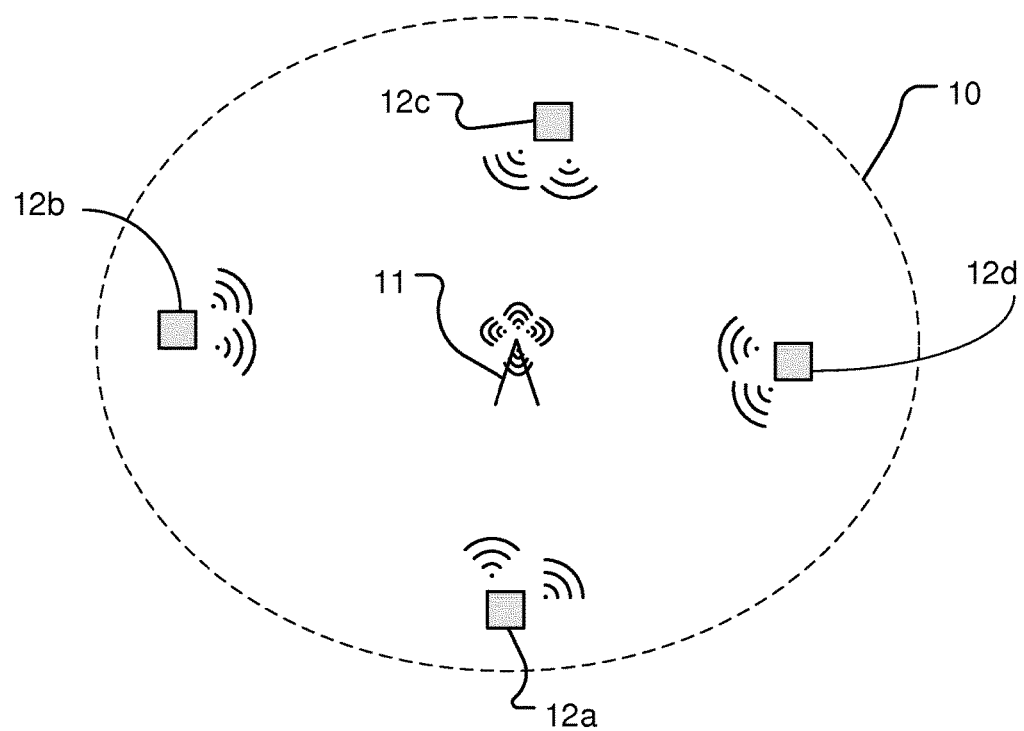
FIG. 1 is a schematic overview of a wireless communication system according to aspects of the present teaching.

Aspects of the present disclosure will be described more fully hereinafter with reference to the accompanying drawings. The apparatus and method/s disclosed herein can, however, be realized in many different forms and should not be construed as being limited to the aspects set forth herein. Like numbers in the drawings refer to like elements throughout.

The terminology used herein is for the purpose of describing particular aspects of the present disclosure only, and it is not intended to limit the invention. As used herein, the singular forms "a", "an" and "the" are intended to include the plural forms as well, unless the context clearly indicates otherwise.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

A "wireless communication device" as the term may be used herein, is to be broadly interpreted to include a radiotelephone having ability for Internet/intranet access, web browser, organizer, calendar, a camera (e.g., video and/or still image camera), a sound recorder (e.g., a microphone), and/or global positioning system (GPS) receiver; a personal communications system (PCS) user equipment that may combine a cellular radiotelephone with data processing; a personal digital assistant (PDA) that can include a radiotelephone or wireless communication system; a laptop; a camera (e.g., video and/or still image camera) having communication ability; and any other computation or communication device capable of transceiving, such as a personal computer, a home entertainment system, a television, etc. Furthermore, a device may be interpreted as any number of antennas or antenna elements.

The terms radio node or radio network node or eNodeB are used interchangeably throughout the text in the example embodiment description. Such node comprises in a general sense any node transmitting radio signals used for measurements, e.g., eNodeB, macro/micro/pico base station, home eNodeB, relay, beacon device, or repeater. A radio node herein may comprise a radio node operating in one or more frequencies or frequency bands. It may be a radio node capable of the network infrastructure management software CA. It may also be a single- or muti-Radio Access Technology, RAT, node. A multi-RAT node may comprise a node with co-located RATs or supporting multi-standard radio, MSR, or a mixed radio node.

The described assumptions in upcoming paragraphs should not in any way be regarded as limiting to the scope of protection, since they are only made to facilitate a pedagogical explanation of the disclosure, i.e., the present disclosure may be utilized with parameters belonging to other standards, and other hardware implementations and/or combinations.

The modules, e.g. Crosstalk and Mismatch, CTM, module, CTM identification module, the Dual-Input Digital Predistorter, DI DPD, module, and DI DPD identification module, of this present disclosure will be described in terms of functional units. The implementation of these units may be made in hardware or software or in a combination thereof. The modules can, depending on implementation, comprise other units or modules that are not directly affecting the proposed functionality. Moreover, the functionality of several modules as described in the text and the drawing might be implemented in one common module and the functionality of one module might be divided among different modules without limiting the scope of protection.

The behavior of hardware can be frequency dependent. The effects of such behavior are referred to as dynamic effects or memory effects. Correspondingly, the term static refers to something (e.g. a function, hardware) that does not consider memory effects.

In some of the figures operations and modules are illustrated with a solid border or with a dashed border. The operations and modules which are illustrated with solid border are operations which are comprised in the broadest example embodiment. The operations and modules which are illustrated with dashed border are example embodiments which may be comprised in, or a part of, or are further embodiments which may be taken in addition to the operations and modules of the broader example embodiments. It should be appreciated that the operations do not need to be performed in order. Furthermore, it should be appreciated that not all of the operations need to be performed. The example operations may be performed in any order and in any combination. Moreover, all figures are illustrative which means that further devices, method steps modules can be incorporated without exceeding the scope of protection.

Some of the example embodiments presented herein are directed towards compensation of crosstalk and mismatches introduced at the output of a multi-antenna system. As part of the development of the example embodiments presented herein, a problem will first be identified and discussed.

The presented systems and methods disclose how to compensate crosstalk and mismatches introduced at the output of a multi-antenna system. This is achieved by reducing the number of input signals to the digital-pre distorter by introducing a Crosstalk and Mismatch module which reduces the multiple crosstalks and mismatch signals from each antenna output into one signal.

To facilitate the understanding of the proposed technique aspects of wireless communications and especially distortions in multiple antenna systems are further discussed.

A typical scenario is illustrated in FIG. 1 which shows a cellular radio system 10. The system comprises wireless communication devices 12a-12d (also denoted terminals, mobile stations, user equipment units, UEs) which communicate via a radio access network, RAN, to one or more core networks via a radio network node 11 (also denoted Radio Base Station, RBS). That is, the RBS is capable of transmitting radio signals to a UE and receiving signals transmitted by a UE. For example, the Universal Terrestrial Radio Access Network, UTRAN, is the radio access network of a UMTS and Evolved UTRAN, E-UTRAN, is the radio access network of an LTE system. In an UTRAN and an E-UTRAN, a User Equipment, UE, is wirelessly connected to a Radio Base Station, RBS, commonly referred to as a NodeB, NB, in UMTS, and as an evolved NodeB, eNB or eNodeB, in LTE. An RBS is a general term for a radio network node capable of transmitting radio signals to a UE and receiving signals transmitted by a UE. Another typical scenario is microwave communication system that utilizes point-to-point radio links, i.e., line of sight communication.

One way of increasing the capacity of a RAN is to utilize multiple-antenna systems, e.g. MIMO, Multiple Input Multiple Output-antennas in the wireless communication devices 12a-12d and the RBS 11. A MIMO-antenna comprises several antenna elements that can be utilized to send and receive more than one data signal on the same radio channel simultaneously via multipath propagation. MIMO-antennas can also be applied in line of sight communication. MIMO technology is commercially used and is standardized for wireless LANs, 3G, and 4G communications and in the standardization process for 5G wireless communications. Each transmit path of such multiple-antenna system has its own power amplifier, PA, and antenna and large-scale systems like for example massive MIMO can be comprised of up to several hundreds of antennas.

There are however challenges with the multiple-antenna technique. For example, the use of several transmit paths increases system complexity which makes integrated solutions preferable. In an integrated solution e.g. costly components like bulky isolators between power amplifier and antennas can to some extent be avoided. However, one problem in multi-antenna transmitters with integrated solutions is crosstalk which means that a signal transmitted in a signal path, e.g. circuit, creates an undesired effect in another signal path. Hence, the signal quality is reduced, which for example can be quantified by the Error Vector Magnitude, EVM, or the Adjacent Channel Leakage Ratio, ACLR.

Crosstalk in multi-antenna transmitters can be called linear or nonlinear. Crosstalk introduced prior to components with nonlinear transfer functions is referred to as nonlinear. The reason is that the crosstalk must pass through the component with the nonlinear transfer function, e.g. a power amplifier, and thereby be altered according to the transfer function. Conversely, so called linear crosstalk, i.e., antenna crosstalk, is introduced after the components with nonlinear transfer functions. Hence, this crosstalk does not pass through the component with the nonlinear transfer function.

Antenna crosstalk is time dependent due to the fact that the signals in the different signal paths vary over time.

Another dilemma in an antenna system is distortions due to impedance mismatches at the antenna port, causing part of the signal to be reflected back into the circuitry. These impedance mismatches are frequency as well as time-dependent. The time dependency is due to the fact that a disturbance of the reactive field of an antenna couples to the antenna input impedance. Hence, weather conditions or passing objects affect the impedance mismatch.

That is, multiple-antenna transceivers with integrated solutions are vulnerable to crosstalk due to mutual coupling between the antennas (antenna crosstalk), antenna mismatches, and crosstalk due to coupling from other sources like e.g. between transmission lines. These disturbances modulate the load-impedance of the PA which, together with the nonlinear behavior of the PA, causes nonlinear distortion at the transmitter outputs and thus undesired radiated field properties when combined.

Figure 2:
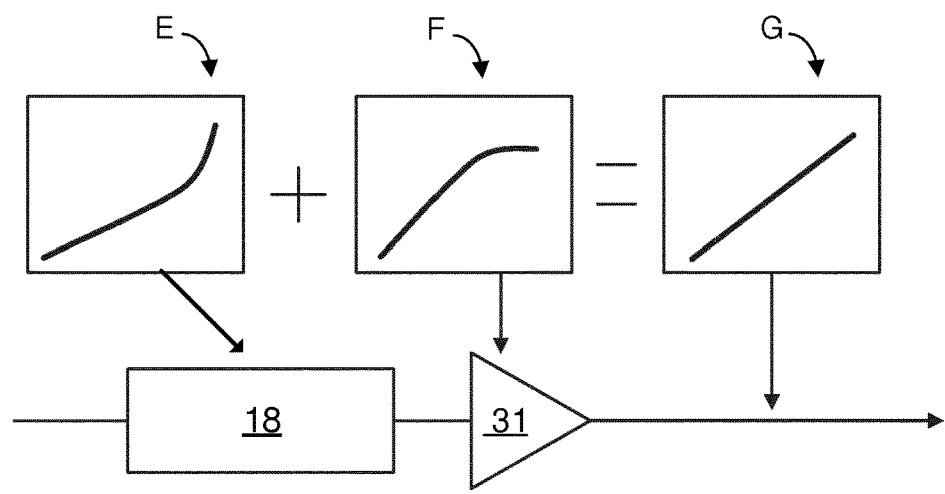
FIG. 2 illustrates aspects of a Digital Predistorter, DPD.

To reduce the unwanted effects in the signals, compensation techniques like digital predistortion, DPD, have been proposed. In a DPD, the input signal to the amplifier is distorted in the digital domain before up-converting to RF to compensate for nonlinear dynamic effects of the PA. Hence, a purpose of the DPD is to alter the signal to compensate for the disturbances. This can be done by providing a model, i.e. a description, of the distortions and to apply the inverse of this model to the signal. This is figuratively illustrated in FIG. 2 for a PA. Present are a signal path passing through a Digital Predistorter 18, DPD, and a PA 31. The PA is a nonlinear device and the PA introduced distortion is modeled in graph F above the physical component. To compensate for the deficiencies of the PA, an inverse of the PA model is provided for by the DPD as illustrated in graph E, and applied to the signal. In the ideal case, the signal passes through the DPD and the PA without any noticeable distortions which is illustrated in graph G.

Figure 4A:
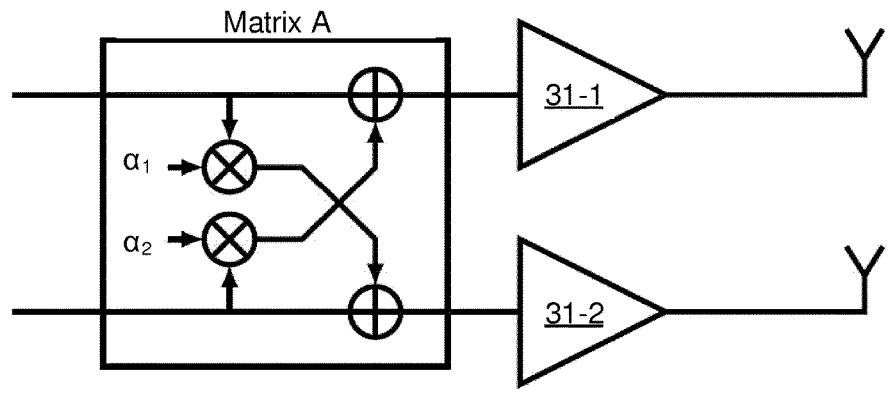
FIG. 4a-b illustrates how crosstalk introduced before the amplifiers can be modeled.
Figure 4B:
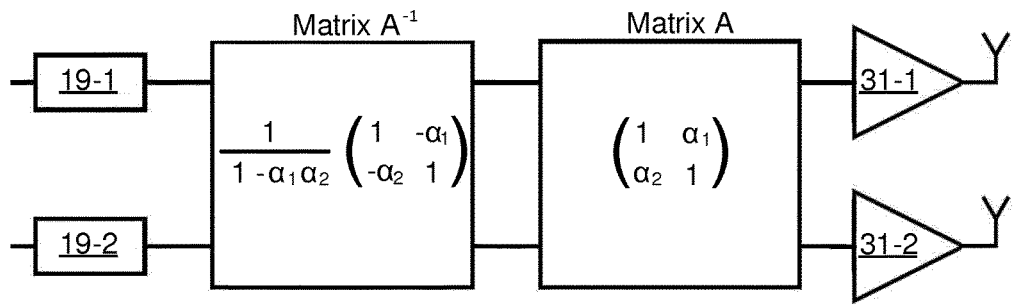

However, conventional single-input DPD can only compensate for PA nonlinearity but not for crosstalk and is therefore not suitable for multi-antenna systems. To reduce crosstalk introduced before the amplifier in a multi-antenna system, multi-antenna system DPDs, often referred to as MIMO-DPDs, can be applied. FIG. 4a illustrates how crosstalk introduced before the amplifiers 31-1,31-2 can be modeled by a matrix A in a transmitter system having two signals. The matrix elements, $\alpha_{1,2}$, weight how the different signals influence each other. That is, if $\alpha_1=\alpha_2$ no crosstalk is present. This is further illustrated in FIG. 4b. FIG. 4b also illustrates an approach to reduce the distortion by utilizing single input DPDs 19-1,19-2 that provide for an inverse of the matrix A in order to compensate for the distortion, see e.g. "An Improved Cross Talk Cancelling Digital Predistortion for MIMO Transmitters" (Zhang, Z., Shen, Y., Shao, S., Pan, W., & Tang, Y. (2016). *Mobile Information Systems*, 2016.) where a DPD utilizing an estimating technique and a decoupling technique is proposed and in "A Comparative Analysis of Adaptive Digital Predistortion Algorithms for Multiple Antenna Transmitters" (Suryasarman, P. M., & Springer, A. (2015). *Circuits and Systems I: Regular Papers, IEEE Transactions on*, 62(5), 1412-1420.) where the same problem is addressed by utilizing adaptive algorithms in the predistortion process. The above described approaches are however not applicable when it comes to reducing antenna crosstalk, i.e. crosstalk introduced after the amplifiers.

Figure 4C:
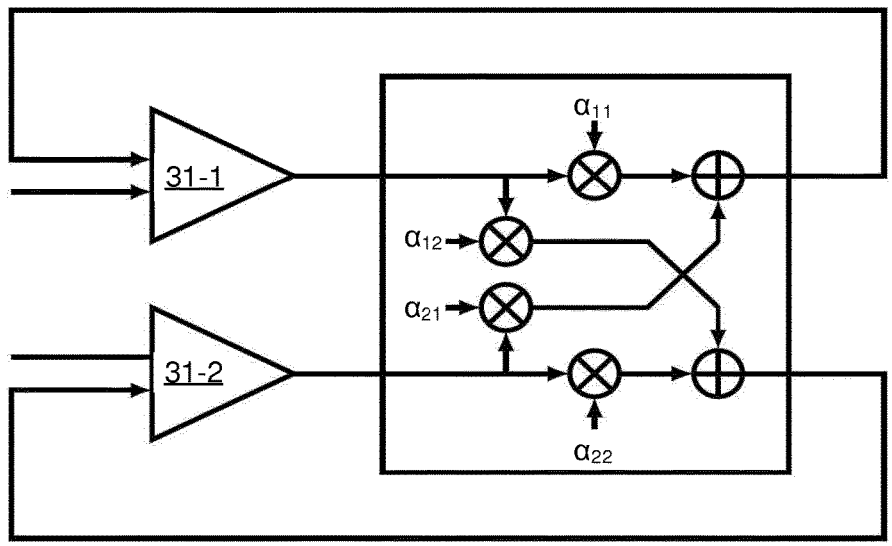
FIG. 4c illustrates how crosstalk introduced after the amplifiers can be modeled.

The antenna crosstalk can be modelled in several ways. One example, applied by the inventors in some variants, is given in FIG. 4c where two signal paths and two power amplifiers, PAs, 31-1,31-2 is present. The influence of the crosstalk is introduced after the PAs, hence the distortions are different from the once in FIGS. 4a-b, where the crosstalk was introduced before the PAs. Moreover, the proposed solutions for the crosstalk in FIGS. 4a-b, see e.g. "An Improved Cross Talk Cancelling Digital Predistortion for MIMO Transmitters" (Zhang, Z., Shen, Y., Shao, S., Pan, W., & Tang, Y. (2016). *Mobile Information Systems*, 2016.) and "A Comparative Analysis of Adaptive Digital Predistortion Algorithms for Multiple Antenna Transmitters" (Suryasarman, P. M., & Springer, A. (2015). *Circuits and Systems I: Regular Papers, IEEE Transactions on*, 62(5), 1412-1420.), are not applicable to antenna crosstalk. In FIG. 4c, the matrix elements $\alpha_{11}$, $\alpha_{12}$, $\alpha_{21}$, and $\alpha_{22}$ are introduced to model the antenna crosstalk. The element $\alpha_{xx}$ where x is 1 or 2 relates, i.e., weights, the signal in one signal path to itself. The element $\alpha_{12}$ weights how the signal in the upper signal path influences on the signal in the lower signal path. Furthermore, the element $\alpha_{21}$ weights how the signal in the lower signal path influences on the signal in the upper signal path.

Crosstalk introduced after the amplifiers, i.e., antenna crosstalk, can be prevented by utilizing isolators (hardware). These are however narrowband, cause losses and increased cost and are therefore not an attractive option, especially since integrated solutions are preferred. It is also possible to compensate for this crosstalk in the transmitter on the receiver side, where the overall linear crosstalk disturbances introduce in the transmitter, the channel, and the receiver are dealt with at once. However, if the antenna crosstalk causes too much distortion outside the transmit channel, it is desirable to compensate for the distortions on the transmitter side. Otherwise the signals might violate spectral masks, adjacent channel leakage ratio requirements etc., and the signals might not be allowed to be transmitted.

Figure 5:
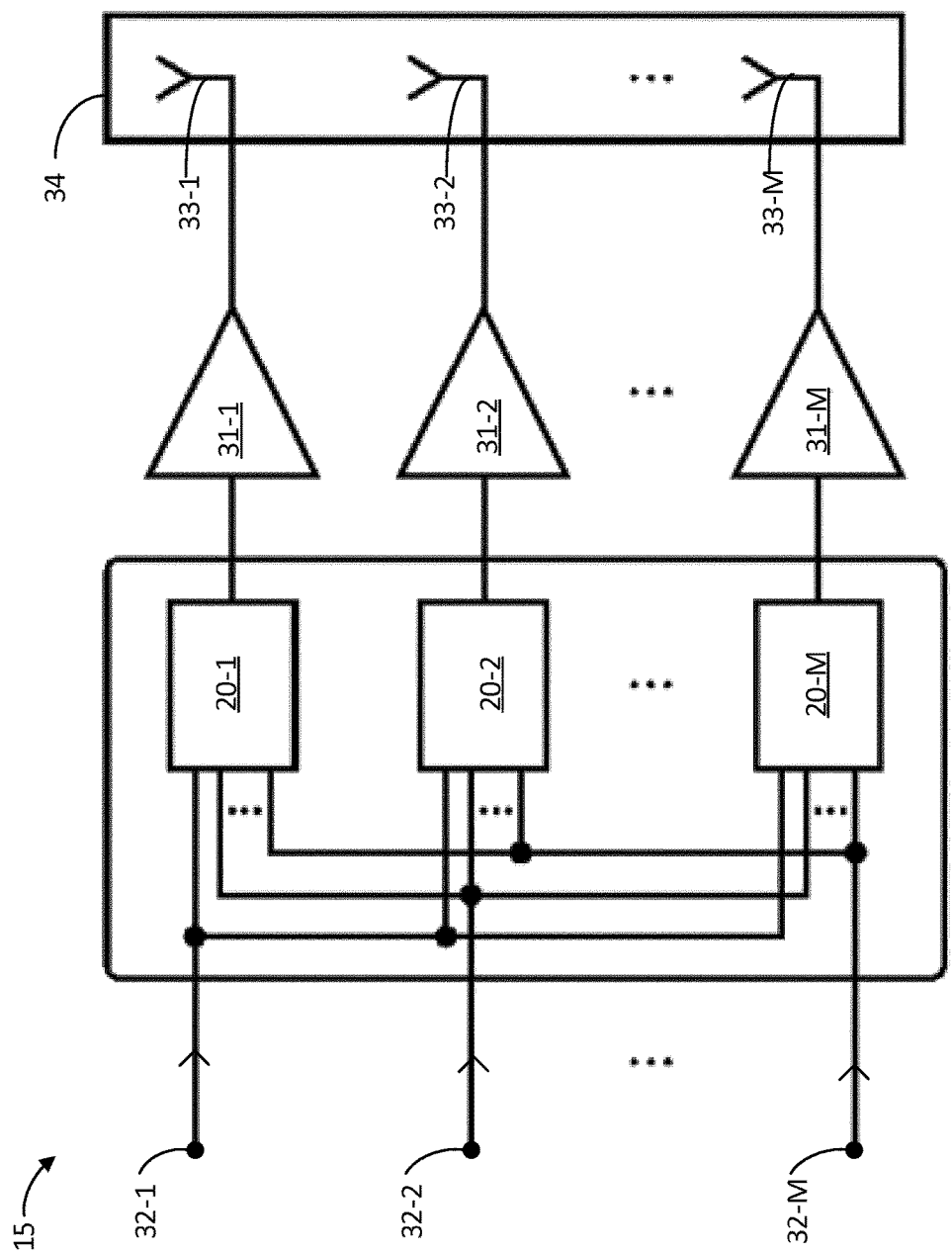
FIG. 5 is a schematic view of a circuit according to aspects of the present teaching.

Another solution to compensate for the antenna crosstalk requires an M-input DPD in every transmit path where M is the number of transmit paths, i.e. M M-input DPDs. This is figuratively illustrated in FIG. 5 showing a transmitter system 15 for an antenna with M antenna elements comprised in an antenna array 34. The system comprises M signal paths, each path having an input node 32-1, ..., 32-M. Each input node is coupled to each of M M-input DPDs 20-1, ..., 20-M and each M-input DPD is further coupled to a PA 31-1, ..., 31-M, which in turn is coupled to an antenna port 33-1, ... 33-M. Every signal path requires an M-input DPD. Hence each DPD receives all input transmission signals and every path requires the identification of the coefficients of an M-variate polynomial function, and the application of that M-variate polynomial function in order to produce a predistorted signal, see e.g. "Behavioral modeling and linearization of crosstalk and memory effects in RF MIMO transmitters" (Amin, S., Landin, P. N., Handel, P., & Ronnow, D. (2014). *Microwave Theory and Techniques, IEEE Transactions on*, 62(4), 810-823.) and "Crossover digital predistorter for the compensation of crosstalk and nonlinearity in MIMO transmitters" (Bassam, S. A., Helaoui, M., & Ghannouchi, F. M. (2009). *Microwave Theory and Techniques, IEEE Transactions on*, 57(5), 1119-1128.). For larger-scale systems like massive MIMO, this procedure is extremely complex or even infeasible.

The inventors have realized that the antenna crosstalk and mismatches at the antenna port can be compensated for in a much simpler and less complex manner. In the present disclosure one CTM module is introduced which provides each DPD with one, specific for each signal path, CTM signal (instead of previously M signals). The CTM signal considers the antenna crosstalk and the mismatch for each specific signal path. Hence, the M complex M-input DPDs are replaced by M less complex Dual-Input DPDs, DI DPDs.

The proposed methods will now be described in more detail referring to FIGS. 6-12.

Figure 6:
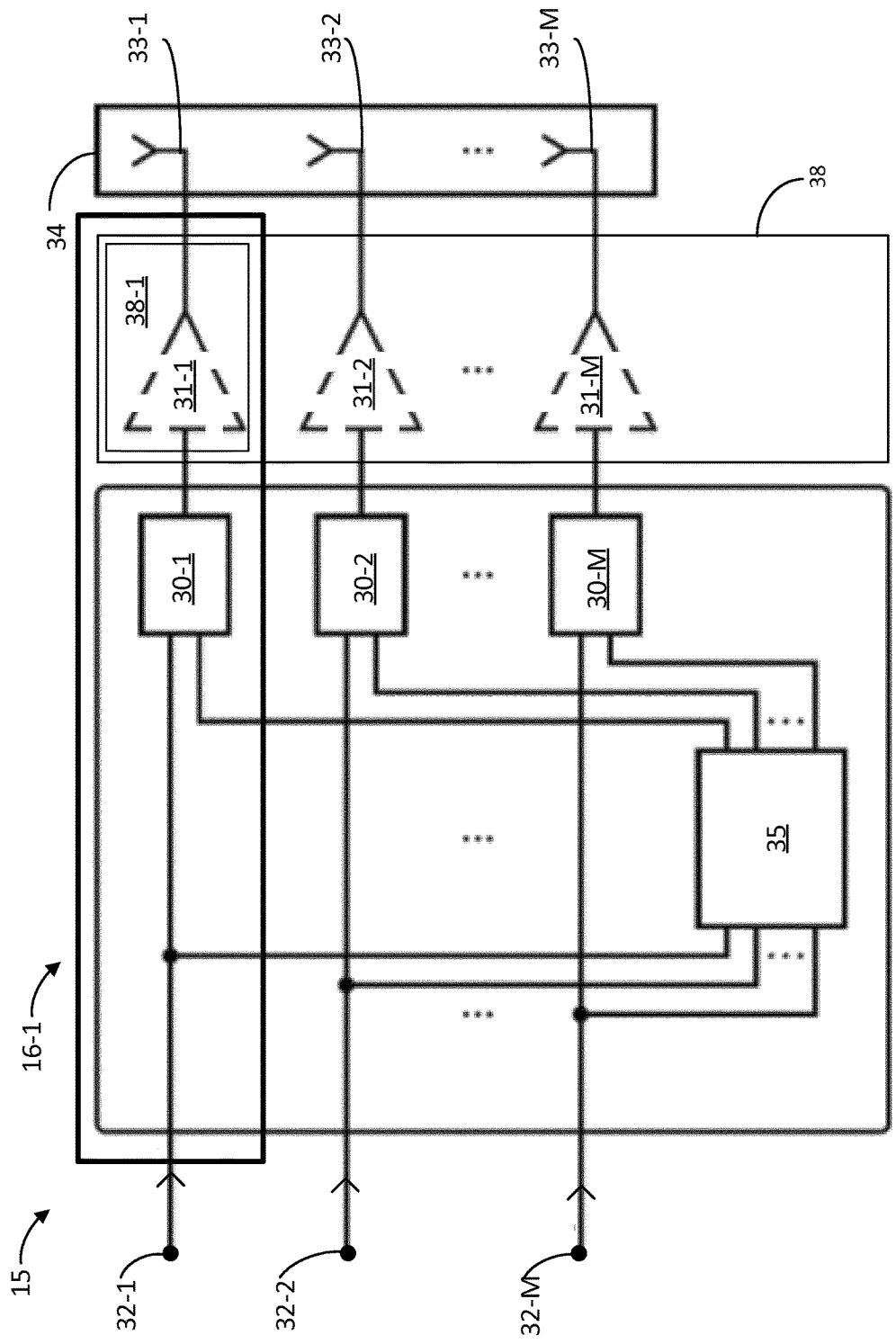
FIG. 6 is another schematic view of a circuit according to aspects of the present teaching.

FIG. 6 shows an exemplary implementation of a circuit according to aspects of the present teaching. Specifically, FIG. 6 depicts a transmitter system 15 for transmitting input transmission signals on respective antenna ports. That is, the system provides signal processing prior to the transmission of the signal by for example some sort of antenna. The transmitter system comprises a plurality of signal paths 16-1. That is, several signal paths comprising separate signals are present. Each signal path comprises an input node 32-1, ... 32-M for receiving an input transmission signal. Expressed differently, the input node is a point in a signal path where a signal is said to enter the transmitter system 15 Each signal path is further comprises an analogue portion 38-1 of the signal path 16-1 connected to an antenna port 33-1, ..., 33-M, where said antenna port 33-1, ..., 33-M is associated with a multi-antenna array 34, and according to some aspects each antenna port 33-1, ... 33-M comprises an antenna element. That is, the antenna elements constitute the multi-antenna array 34. Each signal path is further comprising a Dual-Input Digital Predistortion, DI DPD, module 30-1, ..., 30-M coupled to the input node 32-1, ..., 32-M and the analogue portion 38-1 of the signal path 16-1. Moreover, according to some aspects each analogue portion comprises a power amplifier, PA, 31-1, ..., 31-M.

The transmitter system further comprises one or more Crosstalk and Mismatch, CTM, modules configured to receive one or more input transmission signals. That is each signal path has its own DI DPD, while the CTM model is shared by all the signal paths.

Multi-antenna transmitter performance depends on distortion introduced along the analog portions of the different signal paths, and on coupling between said paths. In particular, as previously discussed, a multi-antenna transmitter is to a some extent characterized by the characteristics of coupling at the PA outputs comprised in said analog portion of the signal paths, and the behavior of these PAs. The PAs introduce nonlinear distortion during the amplification of the PA input signals. In a multi-antenna system suffering from crosstalk and mismatch at the PA output, a Crosstalk and Mismatch, CTM, signal is incident to the output of the PA. This CTM signal mixes with the PA output signal, which causes additional nonlinear distortion. The PA of a multi-antenna system can therefore be described with a bivariate polynomial function, where also memory effects need to be included in the case of wideband input signals.

The CTM signal of one signal path of the transmitter depends on the output signals of several, often all, signal paths. The amount and nature of the CTM signals is determined by the sources and characteristics of coupling at the PA output. These can for example be described by an S-parameters matrix, but also linear filter functions could be suitable to describe these characteristics. Linear filter functions can be necessary to describe coupling characteristics over a large frequency range.

In the proposed solution a CTM module, shared by the whole system is configured to separately generate for each DI DPD module 30-1, . . . , 30-M the CTM signal, where said CTM signals represent CTM distortions caused by one or more output transmission signals of each said analogue portion 38-1 of the signal path 16-1. Hence, the CTM block creates the second input to each of the DI DPD blocks which describes the power reflected back into the PA due to the CTM distortions. In other words, the CTM provides each DI DPD with a CTM signal in order to enable the DI DPD to minimize the effect of the CTM distortions.

Specifically, the CTM module provides each signal path with a CTM signal that corresponds at least approximately to the antenna crosstalk, i.e., the undesired coupling between the analog portions of the transmitters, and the antenna mismatch distortions introduced in the corresponding analogue portion of each signal path, as previously discussed. In other words, the CTM distortions for each signal path 16-1 are caused by one or more antenna crosstalks, between respective output transmission signals and one or more other output transmission signals and/or circuitry mismatches at the output of respective analogue portion 38-1 of the signal path 16-1. That is, the transmitter system provides for compensation, for each specific signal path of antenna crosstalk between the antenna elements of a multi-port antenna and the circuitry mismatches at the output of said specific signal path.

The claimed subject matter differs from previously discussed solutions in at least that the proposed technique deals with antenna crosstalk, i.e., crosstalk introduced in the analogue path and hence after the power amplifier. Moreover, as stated above, each signal path has its own dual-input DPD, while a CTM model is shared by all the signal paths. Since the CTM module provides each signal path with a CTM signal that corresponds at least approximately to the antenna crosstalk of that path a dual-input DPD is enough in each signal path. Previously, a more complex M-input DPD has been required in each signal path, where M is the number of signal paths, in order to consider and reduce the antenna crosstalk.

Further rephrasing the proposed technique and according to some aspects the CTM distortions for each signal path 16-1 are caused by one or more portions of one or more output transmission signals at an output of each said analogue portion 38-1 of the signal path 16-1. Moreover, each CTM signal is generated in response to all input transmission signals and a representative model of said CTM distortions. That is, the representative model is a description of the relation between the multi-antenna output transmission signals and CTM signals of each signal path. Often all output transmission signals, i.e., the signals in the analogue portion of the signal paths, are taken into account but it is not necessary. An advantage is that it is provided a representative model that describes the relation of the CTM signal of each path to the output signals of all signal paths. This gives the skilled person a higher flexibility to adapt the system to different use-cases.

According to some aspects, the CTM module is configured to separately generate the CTM signals for each DI DPD module based upon a linear system having the input transmission signals as input parameters. This is suitable for transmitter system with any kind of crosstalk and mismatch at the PA output that can be described as a linear function of several (in most cases all) transmitter output signals, i.e., the CTM module performs calculations based on weighted linear combinations. An advantage is that a linear model is easy to implement.

According to some further aspects regarding the CTM module, the CTM module 35 can be configured to separately generate the CTM signals for each DI DPD module based upon S-parameters, of the multi-antenna array 34. Alternatively, the CTM module 35 is configured to separately generate the CTM signals for each DI DPD module based upon linear filter functions. That is, the CTM module could for example comprise a matrix containing the antenna S-parameters, or a set of linear filter functions. Such solutions enable the skilled person to configure the CTM module in a way that suits his purposes. Moreover, by utilizing linear filter functions it is allowed for a description of the coupling characteristics over a large frequency range, i.e., memory effects are considered.

In some examples, the coupling characteristics are known from simulations or measurements, like e.g. simulated or measured antenna array S-parameters. In such cases, these characteristics can be directly used in the CTM module.

According to even further aspects regarding the CTM module, the CTM module is configured to comprise a plurality of periodically updated CTM coefficients, said coefficients being applied to separately generate the CTM signals for each DI DPD module. The CTM coefficients can for example be the S-parameters of the multi-antenna array. In another example the coefficients can be filter coefficients comprised in the description of a linear filter function. In variants where the crosstalk and mismatch at the PA output can be described as a linear function of several (in most cases all) transmitter output signals and where such linear function is implemented in the CTM module, the CTM coefficients are weights in the linear combination. In some variants the CTM module can comprise other models describing the CTM signals and then the CTM coefficients can be weights related to these models. The periodic update enables a feedback system capable of compensating time varying distortions, i.e., the compensation result of the system is improved. The distortions can for example be time-dependent impedance mismatch at the antenna port or antenna crosstalk, as previously discussed.

In one variant, CTM coefficients of the representative model are identified using conventional least-squares estimation algorithms.

The digital predistorter in FIG. 6 is a DI DPD configured to provide a predistorted input transmission signal to the analogue portion 38-1 of the signal path 16-1 in response to a received Crosstalk and Mismatch, CTM, signal and the input transmission signal. That is, the task of each DI DPD is to minimize the influences of all distortions introduced in the analogue portion of the signal path and the antenna port of each signal path. The basic concept of a digital predistorter is to compensate for nonlinear effects caused by the PA as has been discussed previously. The DI DPDs in the presented disclosure are dual-input systems that compensate for the nonlinear distortion introduced by the PA, the CTM signals, and the mixing of PA output and CTM signals. The DI DPD comprises a bivariate function that is the inverse of the PA, or an approximation thereof, and therefore eliminates or reduces the undesired distortion.

Hence, due to the fact that a CTM module is present, each DI DPD is fed with the transmission input signal and only one CTM signal independent of the number of transmit paths. This means, according to some aspects that the DPD of each transmit path is reduced to a bivariate polynomial function, which leads to a more linear scaling in terms of complexity compared to the multivariate case where M-input DPDs were utilized, c.f. FIG. 5.

The exact structure of the DI DPD can be chosen according to requirements. E.g. it could be a Volterra series-based bivariate polynomial (e.g. a static polynomial, a memory polynomial, a generalized memory polynomial), a look-up table, a neural network predistorter, radial-basis function-based predistorter, etc. These options enable the skilled person to configure and implement the DI DPD modules module in a way that suits his purposes.

Figure 3:
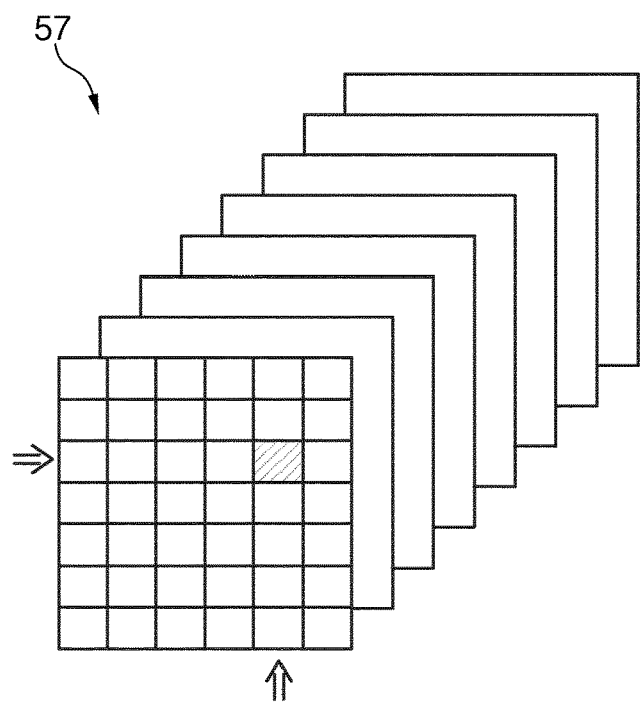
FIG. 3 illustrates aspects of a Look-Up Table, LUT.

That is, according to some aspects regarding the DI DPD modules, each of the DI DPD modules 30-1, . . . , 30-M can be configured to predistort the input transmission signal based on one or more entries in a DI DPD Look Up Table 57 stored in respective DI DPD module 30-1, . . . , 30-M. Moreover, the one or more entries are selected in response to the individual CTM signal and said input transmission signal. In other words, each DI DPD comprises a LUT. The LUTs of the different signal paths often, but not necessarily, have the same basic structure but the entries are usually different for each signal path. A LUT 57 can be more or less complicated, the entries in a LUT can for example represent a plurality of parameters characterizing operating conditions of the system such as temperature, supply voltage, operating frequency of PA, bandwidth of the signals, load condition, bias setting of the different antenna elements, or other performance requirements of the system in general. However, a simple illustrative drawing is given in FIG. 3. Here it is visualized that based on the two inputs, corresponding to the CTM signal and the input transmission signal (marked with arrows) to the DI DPD one entry (dashed) in the LUT is looked up, not calculated, and given as the output. The output entry of the LUT is then utilized in order to predistort the input transmission signal before it is transmitted into the analogue portion of the signal path. The predistortion is performed such that the influences of the undesired distortions in the analogue portion are minimized.

As mentioned, an alternative DI DPD structure is to let each of the DI DPD modules 30-1, . . . , 30-M be configured to predistort the input transmission signal based on a DI DPD transfer function. Moreover, the DI DPD transfer function, may in regard to some aspects, comprises one or more of a Volterra series-based bivariate polynomial (e.g. a static polynomial, a memory polynomial, a generalized memory polynomial), a neural network predistorter, and/or a radial-basis function-based predistorter. That is, a DI DPD transfer function based on different basis functions is implemented. For this implementation, the output of the DI DPD is calculated as a sum of different weighted combinations of the two input signals, where the possible combinations are determined by the basis functions and the weights are denoted as DI DPD coefficients. These coefficients could in one example be stored in LUTs. An output value is then calculated based on these coefficients, which is further comprised in the bivariate function that is the inverse of the PA, or an approximation thereof, and therefore eliminates or reduces the undesired distortion. To clarify, the coefficients of the DI DPD blocks are generally different for every signal path, but they commonly share the same structure in terms of basis-functions.

In one variant, the DI DPD coefficients are identified using conventional least-squares estimation algorithms. This could for example be the case if an indirect-learning or direct-learning architecture is utilized.

To put the presented solution in perspective, a comparison to previous discussed alternative solutions, c.f. FIG. 5, is made. In the exemplary in FIG. 5, the CTM signals from all signals paths are forwarded as M-input signals into each and every M-input DPD. Presently discussed FIG. 6 illustrates a solution for multi-antenna system DPD consisting of two main modules: one Crosstalk and Mismatch CTM module common for the whole transmitter which condense the mismatch signals from each antenna output and the multiple crosstalks into one signal, and a dual-input, DI, DPD module in every signal path. The advantage is that even by considering knowledge of the coupling characteristics the number of input signals to the digital-pre distorter is reduced to two, hence DI-DPDs can be utilized. That is, the system compensates for distortions introduced in the analogue portion of the signal path in an integrated and less-complex manner.

The analogue portion of a signal part may comprise several devices. This is for example illustrated in FIG. 9 which gives a schematic view of the analogue portions 38-1 of the signal paths 16-1. That is, the analogue portion of each signal path comprises one or more of a radio frequency digital analogue converter, RF DAC, 61, a power amplifier, PA, 31, 31-1, . . . , 31-M, a mixer 62, a filter, RF Digital Up Converter, RF DUC, Baseband DUC, BB DUC, a local oscillator 63, and a matching network 65. The figure is to be figuratively interpreted and the analogue portion of the signal path can comprise other devices within the scope of protection.

Figure 7:
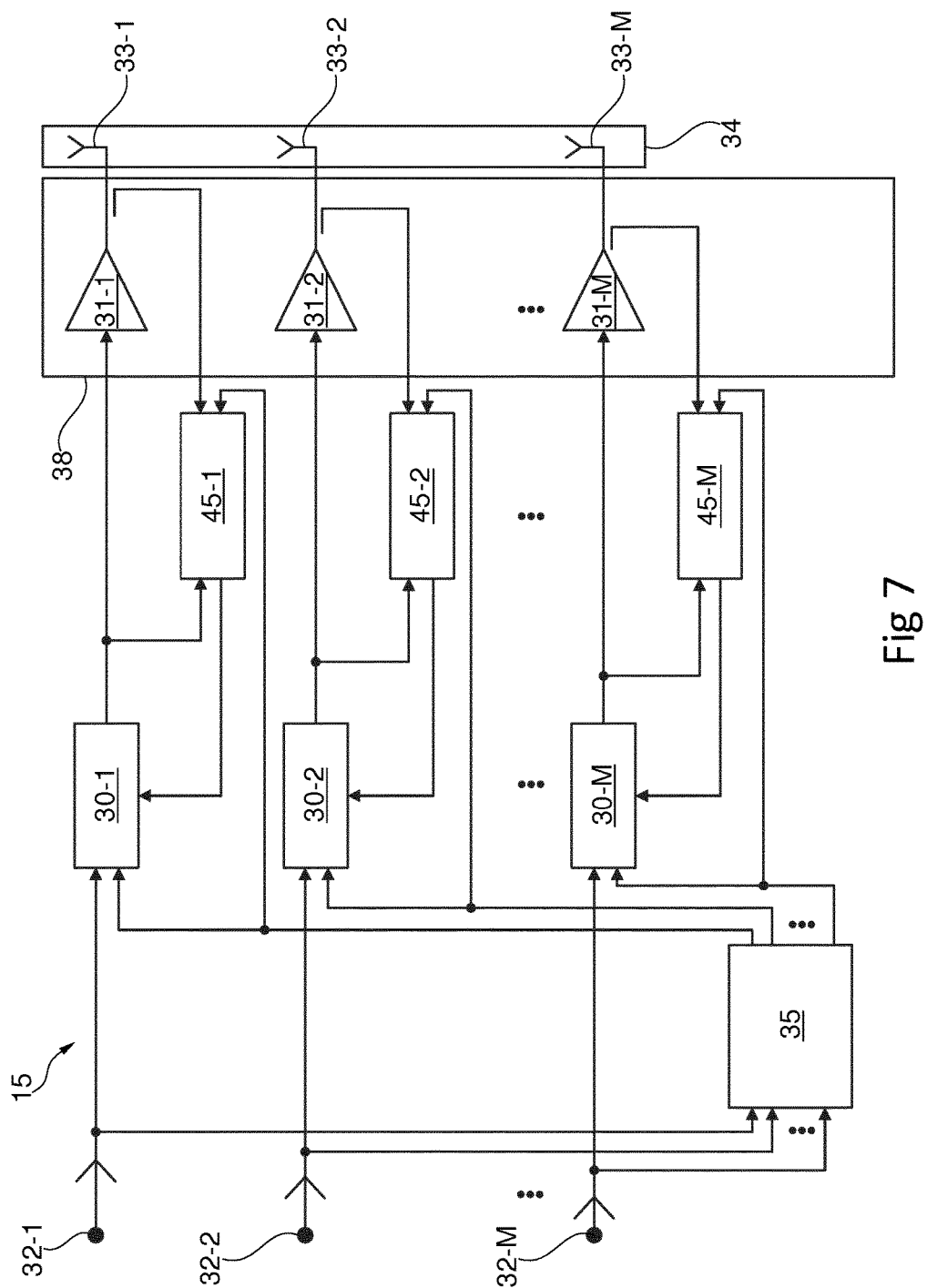
FIG. 7 is yet another schematic view of a circuit according to aspects of the present teaching.

FIG. 7 is a schematic view of a circuit according to aspects of the present teaching, where each signal path of the transmitter system further comprises a DI DPD identification module 45-1, . . . 45-M configured to periodically update entries of each DI DPD LUT of each DI DPD module 30-1, . . . 30-M and/or DI DPD coefficients of each DI DPD transfer function of each DI DPD module 30-1, . . . 30-M in response to each of the predistorted input transmission signals provided by each of the DI DPD modules 30-1, . . . 30-M and each of the output transmission signals at the output of the analogue portion 38-1 of the signal path 16-1. In other words, a portion of the predistorted input transmission signal in each signal path and a portion of the signal at the output of the PA in each signal path are coupled out, or measured, and fed back into the system in order to compensate for time-variations of the PA, e.g. temperature and ageing. Hence, the system's compensation for distortions is improved.

According to some aspects, and as illustrated in FIG. 7, each DI DPD identification module 45 is further configured to periodically update the entries of the DI DPD LUT and/or DI DPD coefficients in response to each of the CTM signals.

Hence, a portion of the individual CTM signal associated with a specific signal path is coupled out, or measured, and fed into the DI DPD identification module of that specific signal path. This enables a feedback system where CTM distortions introduced in the analogue portion of the signal path can be compensated for. Examples of these distortions are antenna crosstalk and mismatches at the antenna port as previously discussed. This feedback enables the system to better minimize the influences of distortions. Moreover, since a CTM module is present, which gives a description of the relation between the CTM signal of each path to the output signals of all signal paths, only one signal, i.e., the CTM signal of a specific path, needs to be fed into the DI DPD identification module of that path. Hence, the feedback system can be implemented in a less-complex manner.

The DI DPD identification module in a signal path periodically updates the entries of the respective DI DPD LUT if the DI DPD comprises a LUT. Alternatively, if the DI DPD comprises a transfer function, its respective DI DPD coefficients are periodically updated by the DI DPD identification module. In other words, the DI DPD identification module identify the entries or the coefficients that are to be used by the DI DPD in response to the signals that are fed into the DI DPD identification module. The updated entries or coefficients are then transmitted to the DI DPD where the corresponding entries or coefficients are updated.

It is understood that the feedback system can be configured in several different ways. The circuit in FIG. 7 does only serve as an example. For example, instead of utilizing the predistorted input transmission signal as input to the DI DPD identification module, the input to the module can be the input transmission signal.

Figure 8:
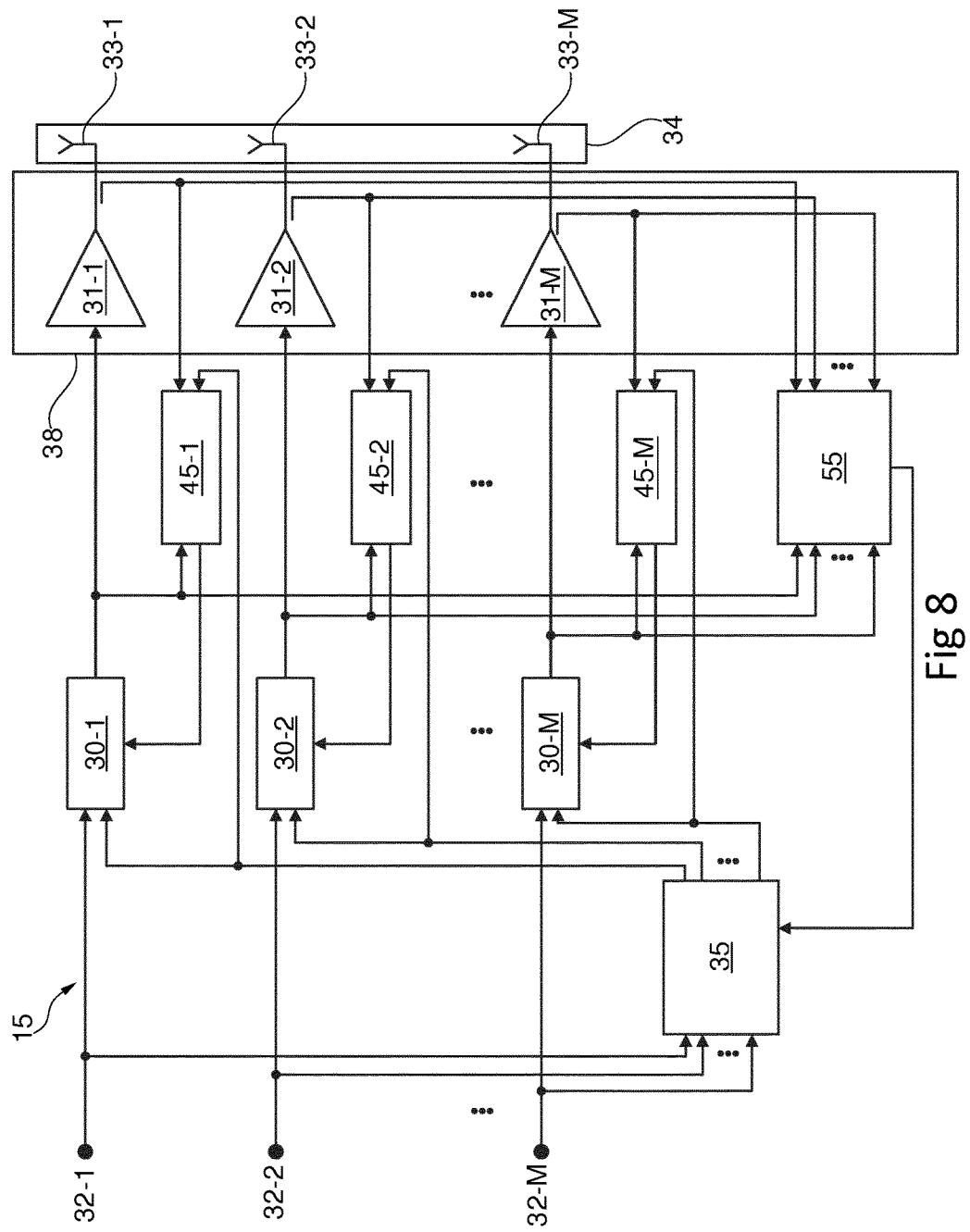
FIG. 8 is a further schematic view of a circuit according to aspects of the present teaching.
Figure 9:
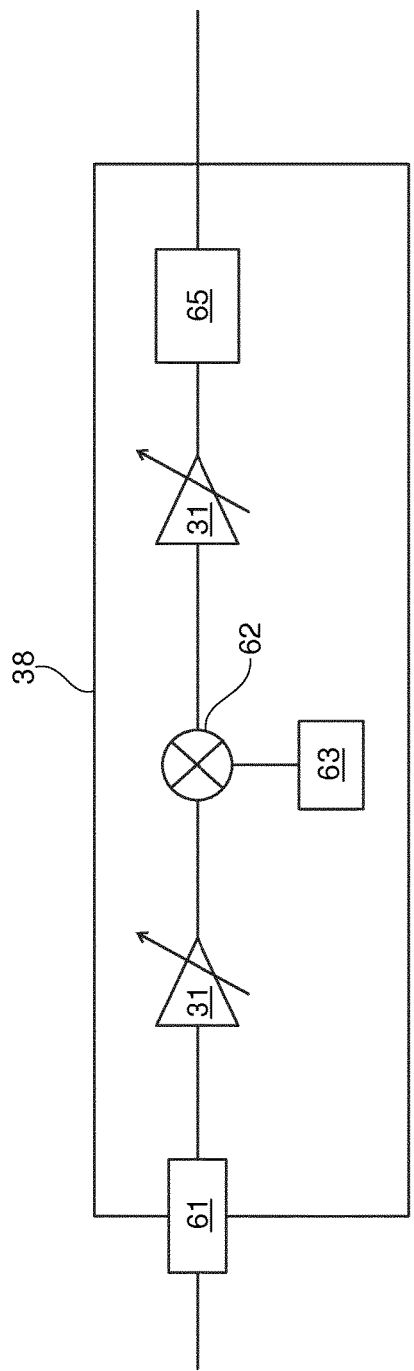
FIG. 9 is a schematic view of an analogue path.

FIG. 8 is a schematic view of a circuit according to aspects of the present teaching, where each signal path of the transmitter system further comprises a CTM identification module 55. Moreover, the plurality of periodically updated CTM coefficients are forwarded from the CTM identification module 55 where the CTM coefficients are identified in response to each of the predistorted input transmission signals provided by each of the DI DPD modules 30-1, ... 30-M and each of the output transmission signals at the output of the analogue portion 38-1 of the signal path 16-1. In other words, a portion of the predistorted input transmission signal in each signal path and a portion of the signal at the output of the PA in each signal path is coupled out, or measured, and fed into the CTM identification module. Correct CTM coefficients are then identified based on the input signals and forwarded to the CMT module where the corresponding coefficients are updated.

An advantage of having periodically updated CTM coefficients is that the system can compensate for time-variant CTM distortions and thereby achieve a more accurate predistortion of the signals. Moreover, the coupling characteristics at the output of a transmitter system are not always known and then an identification process for finding the coefficients is desirable.

An identification alternative that can be utilized when the coupling characteristics are unknown is generally described herein. It is an identification procedure that also can be applied to determine antenna array S-parameters. For this identification procedure, the DPD is not necessary. Hence, the DPD could be disabled for this procedure. In the initial step, the CTM coefficients are set to 1 and the PA output signals are measured. Then the coefficients of a forward model of the PA, described as a dual-input system, are identified. The two inputs are the input transmission signal of the respective path, and the CTM signal of the respective path. The CTM signal is created using the CTM coefficients and all input transmission signals. Then a new measurement is per performed with different input signals. This measurement is compared to the output of the PA model that has previously been identified. New CTM coefficients are then identified based on the measured output signals and the previously estimated PA model. The new CTM coefficients are utilized to identify a new PA model. Again, a new measurement is performed with different input signals. This measurement is compared to the output of the PA model that has previously been identified. This procedure is repeated until the comparison of PA output measurement and PA model output is satisfying.

Another alternative identification procedure is to measure the output transmission signal and to compare it to a known transmission input signal, hence the distortion is estimated and the CTM coefficients are identified. The transmission input signal is predistorted based on the identified coefficients and a new measurement of the output transmission signal is performed. This process is iterated until the measured output transmission signal compares satisfactory to the known transmission input signal. After identifying the CTM model coefficients, these are used in the CTM module to create the second input signals to the DI DPD blocks.

An advantage of having a CTM identification module is that the identification can be done by using observations of the output transmission signals. Moreover, it requires no prior knowledge about the antenna array or the PAs.

It is understood that there are several ways of determining or identifying the CTM coefficients and the generally described alternative given here should in no way to be seen as limiting to the scope of protection.

Example Node Configurations

Figure 10:
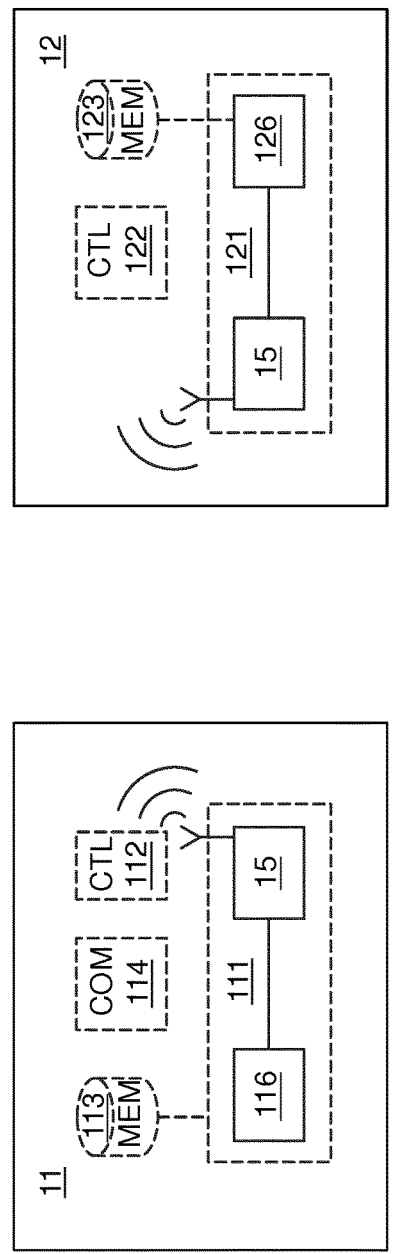
FIG. 10 is an example node configuration schematically illustrating aspects of a network node and a wireless communication device.

FIG. 10 is a node configuration schematically illustrating a network node 11 and a wireless communication device 12 of an exemplary embodiment.

The network node or eNodeB 11 may incorporate one or more of the example embodiments discussed above. As shown in FIG. 10, the eNodeB 11 may comprise a radio circuitry 111 configured to receive and transmit any form of communications or control signals within a network. It should be appreciated that the radio circuitry 111 may be comprised as any number of transceiving, receiving, and/or transmitting units or circuitry. It should further be appreciated that the radio circuitry 111 may be in the form of any input/output communications port known in the art. The radio circuitry 111 comprises a baseband module 116 and one or more transmitter systems 15, wherein the transmitter system 15 may comprise one or more aspects previously discussed in regard to the disclosed transmitter system 15. Thereby, the same advantages and benefits are obtained as for the transmitter system by itself.

The baseband module 116 is configured to comprise all devices and execute all methods regarding a communication signal with its original frequency range of a transmission. That is, the baseband module processes the signal before it is converted, or modulated, to a different frequency range.

The eNodeB 11 may further comprise at least one memory unit or circuitry 113 that may be in communication with the radio circuitry 111. The memory 113 may be configured to store received or transmitted data and/or executable program instructions. The memory 113 may also be configured to store any form of beamforming information, reference signals, and/or feedback data or information. The memory 113 may also be able to store and execute steps and instructions with regard to the previously described transmitter system 15 and corresponding methods. The memory 113 may be any suitable type of computer readable memory and may be of volatile and/or non-volatile type.

The eNodeB 11 may further comprise a network interface 114 and processing circuitry 112 which may be configured to generate and analyze reference signals, and generate beam formed communications. The processing circuitry 112 can according to some aspects be configured to provide instructions and execute steps with regard to the previously described transmitter system 15 and corresponding methods. The processing circuitry 112 may also be configured to provide configuration instructions to the wireless communication device. The processing circuitry 112 may be any suitable type of computation unit, e.g. a microprocessor, Digital Signal Processor, DSP, Field Programmable Gate Array, FPGA, or Application Specific Integrated Circuit, ASIC, or any other form of circuitry. It should be appreciated that the processing circuitry need not be provided as a single unit but may be provided as any number of units or circuitry.

The wireless communication device 12 in FIG. 10 may incorporate one or more of the example embodiments discussed above. As shown in FIG. 10, the wireless communication device 12 may comprise a radio circuitry 121 configured to receive and transmit any form of communications or control signals within a network. It should be appreciated that the radio circuitry 121 may be comprised as any number of transceiving, receiving, and/or transmitting units or circuitry. It should further be appreciated that the radio circuitry 121 may be in the form of any input/output communications port known in the art. The radio circuitry 510 comprises a baseband module 126 and one or more transmitter systems 15, wherein the transmitter system 15 may comprise one or more aspects previously discussed in regard to the disclosed transmitter system 15. Thereby, the same advantages and benefits are obtained as for the transmitter system by itself.

The baseband module 116 is configured to comprise all devices and execute all methods regarding a communication signal with its original frequency range of a transmission. That is, the baseband module processes the signal before it is converted, or modulated, to a different frequency range.

The wireless communication device 12 may further comprise at least one memory unit or circuitry 123 that may be in communication with the radio circuitry 121. The memory 123 may be configured to store received or transmitted data and/or executable program instructions. The memory 123 may also be configured to store any form of beamforming information, reference signals, and/or feedback data or information. The memory 123 may also be able to store and execute steps and instructions with regard to the previously described transmitter system 15 and corresponding methods. The memory 123 may be any suitable type of computer readable memory and may be of volatile and/or non-volatile type.

The wireless communication device 12 may further comprise further processing circuitry 122 which may be configured to perform measurements and set configurations provided by the eNodeB. The processing circuitry 122 can according to some aspects be configured to provide instructions and execute steps with regard to the previously described transmitter system 15 and corresponding methods. The processing circuitry 122 may be any suitable type of computation unit, e.g. a microprocessor, Digital Signal Processor, DSP, Field Programmable Gate Array, FPGA, or Application Specific Integrated Circuit, ASIC, or any other form of circuitry. It should be appreciated that the processing circuitry need not be provided as a single unit but may be provided as any number of units or circuitry.

In one variant, relating to point-to-point radio links, cross talk might be present and the presented transmitter system, as described previously, can be applied. In a particular environment, two network nodes are present which communicate by utilizing point-to-point radio links, i.e., line of sight communication. This could for example be the case in a microwave communication system.

Exemplary Methods

Figure 11:
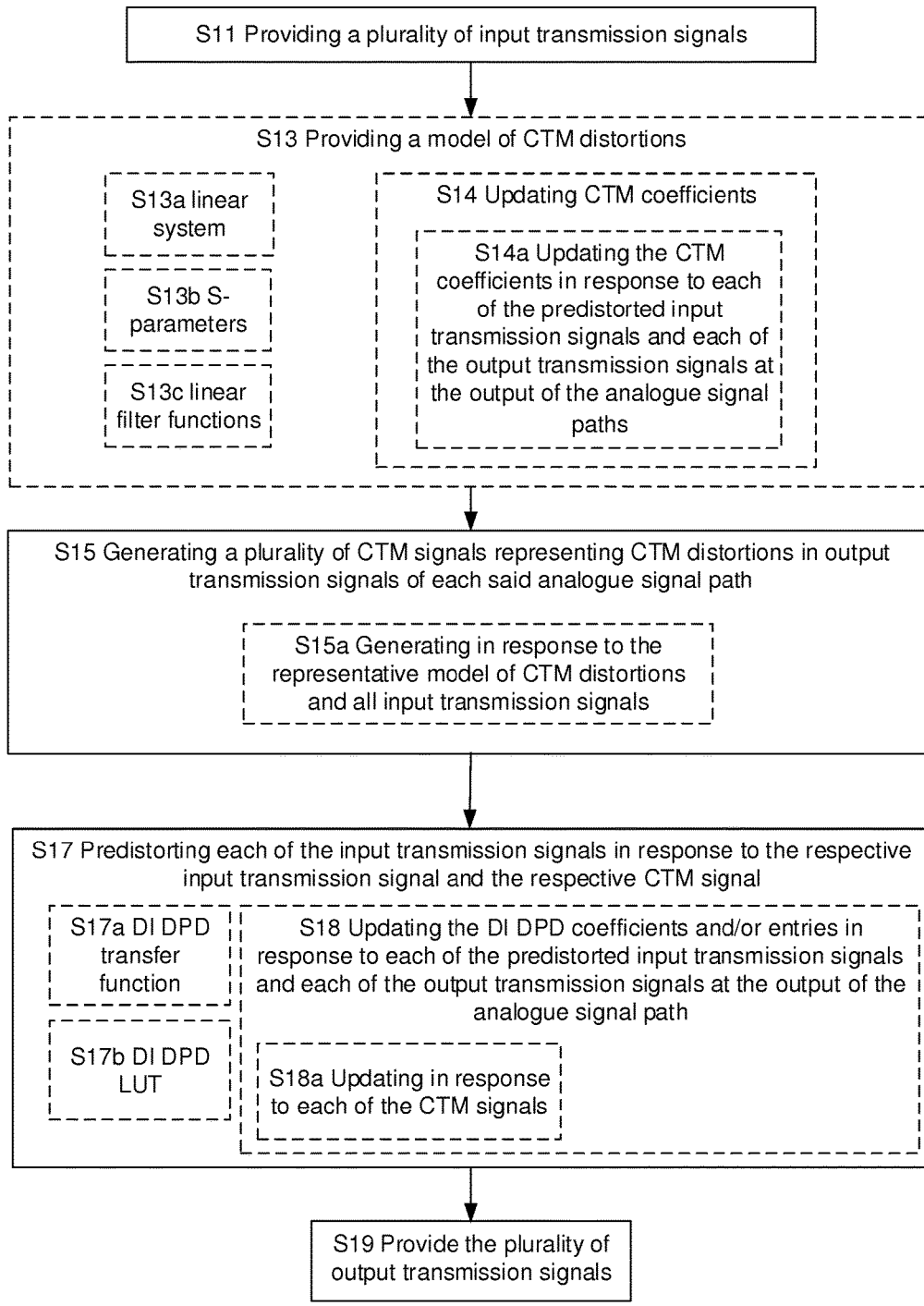
FIG. 11 is a flowchart illustrating aspects of methods according to the present teaching.

FIG. 11 is a flowchart illustrating aspects of corresponding methods for identification and compensation of distortion, caused in a plurality of signal paths 16-1, each one comprising an analogue portion 38-1 of the signal path 16-1 that for example may be performed in a transmitter system 15.

The details of the method steps to be described are already discussed in relation to the corresponding hardware above and will not be repeated. Moreover, one or more of the features, advantages and interrelationships discussed in relation to the different aspects, variants and embodiments of the transmitter system and corresponding nodes, predistortion device and computer program are applicable to the corresponding aspects, variants, and embodiment of the method as described below.

The method comprises providing a plurality of input transmission signals S11. It also comprises generating a plurality of CTM signals S15 representing CTM distortions caused by one or more output transmission signals of each said analogue portion 38-1 of the signal path 16-1. The method further comprises predistorting each of the input transmission signals S17 in response to the respective input transmission signal and the respective CTM signal. The method further comprises applying each of the predistorted input transmission signals to a respective one of the analogue portion 38-1 of the signal path 16-1 to provide a plurality of output transmission signals S19 at an output of each said analogue portion 38-1 of the signal path 16-1.

According to some aspects the method comprises providing a representative model of CTM distortions S13. Moreover, the CTM distortions for each signal path 16-1 are caused by one or more portions of one or more of a plurality of output transmission signals at an output of each said analogue portion 38-1 of the signal path 16-1. Furthermore, the generating of a plurality of CTM signals S15$a$ is in response to the representative model of CTM distortions and all input transmission signals.

According to some further aspects regarding the method, the CTM distortions for each signal path are caused by one or more antenna crosstalks between respective output transmission signals and one or more other output transmission signals and/or circuitry mismatches at the output of respective analogue portion 38-1 of the signal path 16-1.

According to some further aspects the method further provides a linear system S13$a$ as a representative model of the CTM distortions.

According to some further aspects the method further provides S-parameters S13$b$ of a multi-antenna array 34 connected to the analogue portions 38-1 of the signal paths 16-1, as being comprised in the representative model of the CTM distortions. Alternatively, the method provides linear filter functions S13$c$, as being comprised in the representative model of the CTM distortions.

According to some further aspects regarding the method, the model of CTM distortions further comprises CTM coefficients and the method further comprises updating CTM coefficients S14 periodically. According to further aspects, the step of updating S14 may further comprises updating the CTM coefficients S14a in response to each of the predistorted input transmission signals and each of the output transmission signals at the output of the analogue portions 38-1 of the signal paths 16-1.

According to some further aspects the method further provides a DI DPD transfer function S17a wherein the step of predistorting of the input transmission signal S17 is based on the transfer function utilizing one or more of a Volterra series-based bivariate polynomial, a look up table 57, a neural network predistorter, and/or a radial-basis function-based predistorter. Alternatively, the method further provides S17b a DI DPD Look Up Table, LUT, wherein the step of predistorting of the input transmission signal S17 is based on one or more entries in the DI DPD LUT 57, wherein the one or more entries are selected in response to the individual CTM signal and the input transmission signal. Hence, every signal path is provided with a DI DPD transfer function or a DI DPD LUT. Moreover, according to some further aspects the predistorting step S17 further comprises updating S18 DI DPD coefficients of the DI DPD transfer function and/or entries of the DI DPD LUT 57 periodically in response to each of the predistorted input transmission signals and each of the output transmission signals at the output of the analogue portion 38-1 of the signal path 16-1. According to even further aspects, the step of updating may S18 further comprises updating S18a the DI DPD coefficients and/or entries of the DI DPD LUT periodically in response to each of the CTM signals.

Exemplary Computer Programs

It is to be understood that the methods, including aspects, disclosed herein can be implemented in a wide variety of ways. One way being by a computer program comprising computer program code which, when executed in a communication device 11,12, causes the communication device 11,12 to execute the methods described herein. The term communication device refers to a radio base station 11 or a wireless communication device 12 as previously discussed, or for that matter to any other communication device comprising a transmitter system 15 as described herein. According to aspects, the computer program is stored and/or executed in memory 113,123 and or in processing circuitry 112,122, cf. FIG. 10.

Thus, the various example embodiments described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

The computer programs of the transmitter system, the radio network node, the wireless communication device, and the predistortion device all display advantages corresponding to the advantages already described in relation to the respective methods disclosed above.

Exemplary Devices

Figure 12:
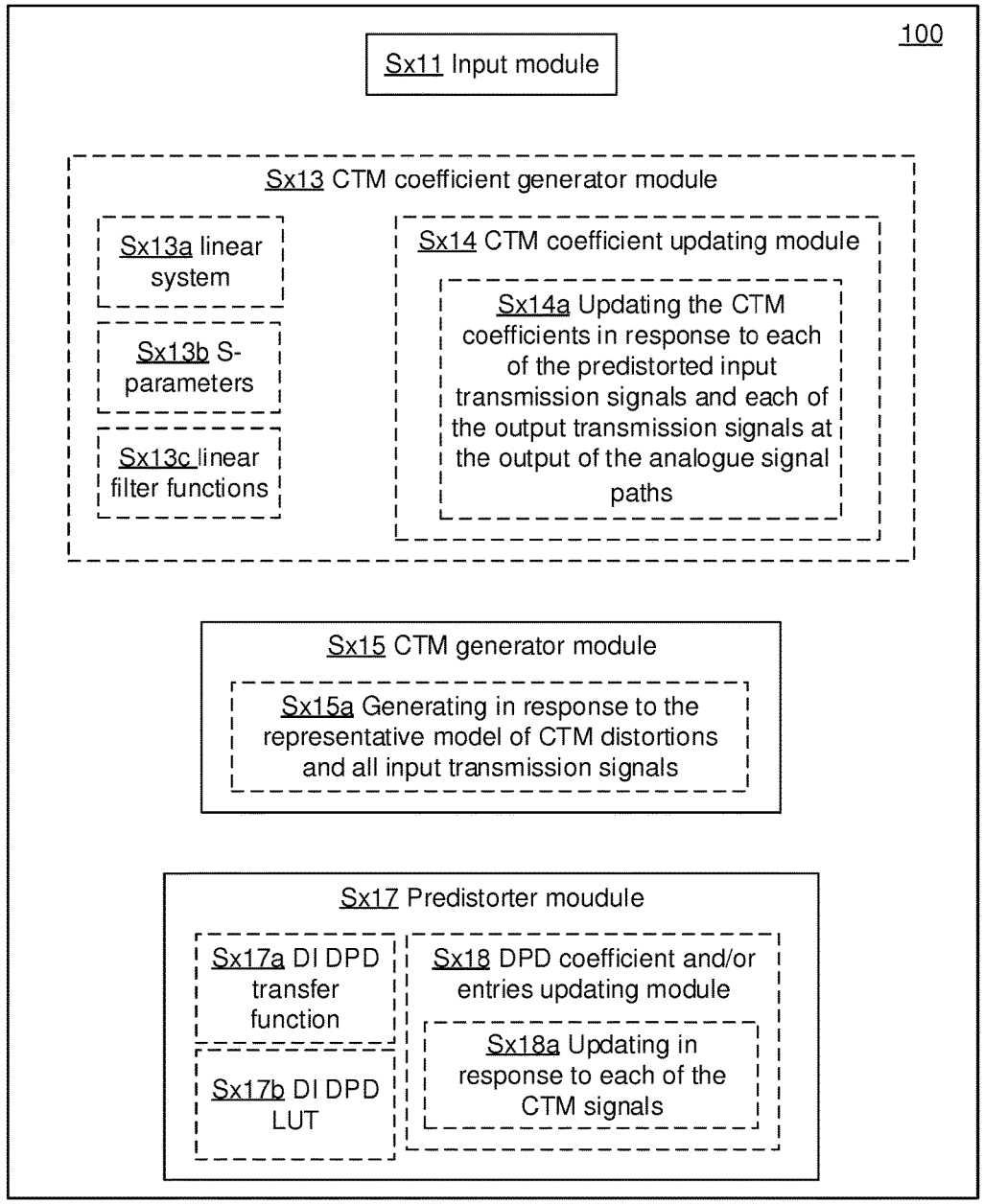
FIG. 12 is an apparatus according to some aspects of the present teaching.

According to aspects it is provided for predistortion device 100 for identification and compensation of distortion, caused in a plurality of signal paths 16-1, each one comprising an analogue portion 38-1 of the signal path 16-1 as figuratively shown in FIG. 12. The predistortion device 100 in FIG. 12 comprises modules configured to perform the methods described above. The modules are implemented in hardware or in software or in a combination thereof. The modules are according to one aspect implemented as a computer program stored in a memory 113,123 which is run on a processing circuitry 112,122, cf. FIG. 10.

One or more of the features, advantages and interrelationships discussed in relation to the different aspects, variants and embodiments of the transmitter system and corresponding nodes, methods and computer programs are applicable to the corresponding aspects, variants, and embodiment of the predistortion device as described below.

According to some aspects, the predistortion device 100 comprises an input module Sx11 arranged to provide a plurality of input transmission signals. It further comprises a CTM generator module Sx15 arranged to generate a plurality of CTM signals representing CTM distortions caused by one or more output transmission signals of each said analogue portion 38-1 of the signal path 16-1. A predistorter module Sx17 is also comprised in the predistortion device and arranged to predistort each of the input transmission signals in response to the respective input transmission signal and the respective CTM signal, wherein the predistorter module Sx17 is arranged to apply each of the predistorted input transmission signals to a respective one of the analogue portion 38-1 of the signal path 16-1.

According to some aspects the predistortion device 100, further comprises a CTM coefficient generator module Sx13 arranged to provide a representative model of CTM distortions, wherein the CTM distortions for each signal path 16-1 are caused by one or more portions of one or more of a plurality of output transmission signals at an output of each said analogue portion 38-1 of the signal path 16-1. Furthermore, the CTM generator module Sx15a is further arranged to generate of a plurality of CTM signals in response to the representative model of CTM distortions and all input transmission signals.

According to some aspects the CTM distortions for each signal path 16-1 are caused by one or more antenna crosstalks between respective output transmission signals and one or more other output transmission signals and/or circuitry mismatches at the output of respective analogue portion 38-1 of the signal path 16-1.

According to further aspects the CTM coefficient module Sx13a is further arranged to provide a linear system as a representative model of the CTM distortions.

According to some aspects the CTM coefficient module Sx13b is further arranged to provide S-parameters of a multi-antenna array 34 connected to the analogue portions 38-1 of the signal paths 16-1. The S-parameters being comprised in the representative model of the CTM distortions.

According to aspects, the CTM coefficient module Sx13c is further arranged to provide linear filter functions, as being comprised in the representative model of the CTM distortions.

According to aspects, the CTM coefficient generation module Sx13 further comprises a CTM coefficient updating module Sx14 arranged to update CTM coefficients periodically. According to further aspects, the CTM coefficient updating module Sx14a is further arranged to update the CTM coefficients S14a in response to each of the predistorted input transmission signals and each of the output transmission signals at the output of the analogue portions 38-1 of the signal paths 16-1.

According to aspects, the predistorter module Sx17a is further arranged to provide a DI DPD transfer function. Moreover, the predistorter module Sx17 is arranged to predistort the input transmission signal based on the transfer function utilizing one or more of a Volterra series-based bivariate polynomial, a look up table 57, a neural network predistorter, and/or a radial-basis function-based predistorter.

According to aspects, the predistorter module Sx17b is further arranged to provide a DI DPD Look Up Table, LUT. Moreover, the predistorter module Sx17 is arranged to predistort the input transmission signal based on one or more entries in the DI DPD LUT 57, wherein the one or more entries are selected in response to the individual CTM signal and the input transmission signal.

According to aspects the predistorter module Sx17 further comprises a DPD coefficient updating module Sx18 arranged to update DI DPD coefficients of the DI DPD transfer function and/or entries of the DI DPD LUT 57 periodically in response to each of the predistorted input transmission signals and each of the output transmission signals at the output of the analogue portion 38-1 of the signal path 16-1. According to further aspects, the DPD coefficient updating module Sx18a is further arranged to update the DI DPD coefficients and/or entries of the DI DPD LUT periodically in response to each of the CTM signals.

In the drawings and specification, there have been disclosed exemplary embodiments. However, many variations and modifications can be made to these embodiments. Accordingly, although specific terms are employed, they are used in a generic and descriptive sense only and not for purposes of limitation, the scope of the embodiments being defined by the following claims.

That is, the description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled person in the art to utilize the example embodiments in various manners and with various modifications as are suited to the particular use contemplated. The features of the embodiments described herein may be combined in all possible combinations of methods, apparatus, modules, systems, and computer program products. It should be appreciated that the example embodiments presented herein may be practiced in any combination with each other.

In some implementations and according to some aspects of the present disclosure, the hardware, functions or steps noted in the blocks can occur out of the order noted in the operational illustrations. For example, two blocks shown in succession can in fact be executed substantially concurrently or the blocks can sometimes be executed in the reverse order, depending upon the functionality/acts involved. Also, the functions or steps noted in the blocks can according to some aspects of the present disclosure be executed continuously in a loop.

The invention claimed is:

1. A transmitter system for transmitting input transmission signals on respective antenna ports, the transmitter system comprising:
 a plurality of signal paths, each signal path comprising:
  an input node for receiving an input transmission signal;
  an analog portion of the signal path connected to an antenna port, the antenna port associated with a multi-antenna array;
  a Dual-Input Digital Predistortion (DI DPD) module coupled to the input node and the analog portion of the signal path, the DI DPD configured to provide a predistorted input transmission signal to the analog portion of the signal path in response to a received Crosstalk and Mismatch (CTM) signal and the input transmission signal; and
 one or more CTM modules configured to:
  receive one or more input transmission signals;
  separately generate, for each DI DPD module, the CTM signal,
  the CTM signals representing CTM distortions caused by one or more output transmission signals of each the analog portion of the signal path.

2. The transmitter system of claim 1, wherein:
 the CTM distortions for each signal path are caused by one or more portions of one or more output transmission signals at an output of each the analog portion of the signal path;
 each CTM signal is generated in response to all input transmission signals and a representative model of the CTM distortions.

3. The transmitter system of claim 1, wherein the CTM distortions for each signal path are caused by one or more antenna crosstalks between respective output transmission signals and one or more other output transmission signals and/or circuitry mismatches at the output of respective analog portion of the signal path.

4. The transmitter system of claim 1, wherein the CTM module is configured to separately generate the CTM signals for each DI DPD module based upon a linear system having the input transmission signals as input parameters.

5. The transmitter system of claim 1, wherein the CTM module is configured to separately generate the CTM signals for each DI DPD module based upon S-parameters of the multi-antenna array.

6. The transmitter system of claim 1, wherein the CTM module is configured to separately generate the CTM signals for each DI DPD module based upon linear filter functions.

7. The transmitter system of claim 1, wherein the CTM module is configured to comprise a plurality of periodically updated CTM coefficients, the CTM coefficients being applied to separately generate the CTM signals for each DI DPD module.

8. The transmitter system of claim 7, wherein the plurality of periodically updated CTM coefficients are forwarded from a CTM identification module where the CTM coefficients are identified in response to each of the predistorted input transmission signals provided by each of the DI DPD modules and each of the output transmission signals at the output of the analog portion of the signal path.

9. The transmitter system of claim 1, wherein each of the DI DPD modules is configured to predistort the input transmission signal based on one or more entries in a DI DPD Look Up Table (LUT) stored in the respective DI DPD module, wherein the one or more entries are selected in response to the individual CTM signal and the input transmission signal.

10. The transmitter system of claim 1, wherein each of the DI DPD modules is configured to predistort the input transmission signal based on a DI DPD transfer function.

11. The transmitter system of claim 9, wherein each signal path further comprise a DI DPD identification module configured to periodically update entries of each DI DPD LUT of each DI DPD module in response to each of the predistorted input transmission signals provided by each of the DI DPD modules and each of the output transmission signals at the output of the analog portion of the signal path.

12. The transmitter system of claim 11, wherein each DI DPD identification module is further configured to periodically update the entries of the DI DPD LUT in response to each of the CTM signals.

13. The transmitter system of claim 10, wherein the DI DPD transfer function comprises one or more of:
   a Volterra series-based bivariate polynomial;
   a neural network predistorter; and/or
   a radial-basis function-based predistorter.

14. The transmitter system of claim 1, wherein each antenna port comprises an antenna element.

15. The transmitter system of claim 1, wherein the analog portions of the signal paths comprises one or more of:
   a radio frequency digital analog converter;
   a power amplifier;
   a mixer;
   a filter;
   Digital Up Converter;
   a local oscillator; and
   a matching network.

16. A radio network node, comprising:
   a baseband module;
   one or more transmitter systems, each transmitter system for transmitting input transmission signals on respective antenna ports, each transmitter system comprising:
      a plurality of signal paths, each signal path comprising:
         an input node for receiving an input transmission signal;
         an analog portion of the signal path connected to an antenna port, the antenna port associated with a multi-antenna array;
         a Dual-Input Digital Predistortion (DI DPD) module coupled to the input node and the analog portion of the signal path, the DI DPD configured to provide a predistorted input transmission signal to the analog portion of the signal path in response to a received Crosstalk and Mismatch (CTM) signal and the input transmission signal; and
      one or more CTM modules configured to:
         receive one or more input transmission signals;
         separately generate, for each DI DPD module, the CTM signal,
         the CTM signals representing CTM distortions caused by one or more output transmission signals of each the analog portion of the signal path.

17. A wireless communication device, comprising
   a baseband module;
   one or more transmitter systems, each transmitter system for transmitting input transmission signals on respective antenna ports, each transmitter system comprising:
      a plurality of signal paths, each signal path comprising:
         an input node for receiving an input transmission signal;
         an analog portion of the signal path connected to an antenna port, the antenna port associated with a multi-antenna array;
         a Dual-Input Digital Predistortion (DI DPD) module coupled to the input node and the analog portion of the signal path, the DI DPD configured to provide a predistorted input transmission signal to the analog portion of the signal path in response to a received Crosstalk and Mismatch (CTM) signal and the input transmission signal; and
      one or more CTM modules configured to:
         receive one or more input transmission signals;
         separately generate, for each DI DPD module, the CTM signal,
         the CTM signals representing CTM distortions caused by one or more output transmission signals of each the analog portion of the signal path.

18. A method for identification and compensation of distortion, caused in a plurality of signal paths, each signal path comprising an analog portion of the signal path, the method comprising:
   providing a plurality of input transmission signals;
   generating a plurality of Crosstalk and Mismatch (CTM) signals representing CTM distortions caused by one or more output transmission signals of each the analog portion of the signal path;
   predistorting each of the input transmission signals in response to the respective input transmission signal and the respective CTM signal;
   applying each of the predistorted input transmission signals to a respective one of the analog portion of the signal path to provide a plurality of output transmission signals at an output of each the analog portion of the signal path.

19. The method of claim 18, further comprising:
   providing a representative model of CTM distortions, wherein the CTM distortions for each signal path are caused by one or more portions of one or more of a plurality of output transmission signals at an output of each the analog portion of the signal path; and
   wherein the generating the plurality of CTM signals is in response to the representative model of CTM distortions and all input transmission signals.

20. The method of claim 18, wherein the CTM distortions for each signal path are caused by one or more antenna crosstalks between respective output transmission signals and one or more other output transmission signals and/or circuitry mismatches at the output of respective analog portion of the signal path.

21. The method of claim 19, further comprising providing a linear system as a representative model of the CTM distortions.

22. The method of claim 19, further comprising providing S-parameters of a multi-antenna array connected to the analog portions of the signal paths, as being comprised in the representative model of the CTM distortions.

23. The method of claim 19, further comprising providing linear filter functions, as being comprised in the representative model of the CTM distortions.

24. The method of claim 19:
wherein the model of CTM distortions comprises CTM coefficients; and
further comprising updating CTM coefficients periodically.

25. The method of claim 24, wherein the updating comprises updating the CTM coefficients in response to each of the predistorted input transmission signals and each of the output transmission signals at the output of the analog portions of the signal paths.

26. The method of claim 18, further comprising providing a Dual-Input Digital Predistortion (DI DPD) transfer function; wherein the predistorting of the input transmission signal is based on the DI DPD transfer function utilizing one or more of:
a Volterra series-based bivariate polynomial;
a look up table;
a neural network predistorter; and/or
a radial-basis function-based predistorter.

27. The method of claim 18:
further comprising providing a Dual-Input Digital Predistortion (DI DPD) Look Up Table (LUT);
wherein the predistorting of the input transmission signal is based on one or more entries in the DI DPD LUT, wherein the one or more entries are selected in response to the individual CTM signal and the input transmission signal.

28. The method claim 26, wherein the predistorting comprises updating DI DPD coefficients of the DI DPD transfer function periodically in response to each of the predistorted input transmission signals and each of the output transmission signals at the output of the analog portion of the signal path.

29. The method of claim 28, wherein the updating comprises updating the DI DPD coefficients periodically in response to each of the CTM signals.

30. A non-transitory computer readable recording medium storing a computer program product for controlling identification and compensation of distortion, caused in a plurality of signal paths, each signal path comprising an analog portion of the signal path, the computer program product comprising software instructions which, when run on processing circuitry of a communications device, causes the communications device to:
provide a plurality of input transmission signals;
generate a plurality of Crosstalk and Mismatch (CTM) signals representing CTM distortions caused by one or more output transmission signals of each the analog portion of the signal path;
predistort each of the input transmission signals in response to the respective input transmission signal and the respective CTM signal;
apply each of the predistorted input transmission signals to a respective one of the analog portion of the signal path to provide a plurality of output transmission signals at an output of each the analog portion of the signal path.

31. A predistortion device for identification and compensation of distortion, caused in a plurality of signal paths, each signal path comprising an analog portion of the signal path, the predistortion device comprising:
processing circuitry, the processing circuitry configured to:
provide a plurality of input transmission signals;
generate a plurality of Crosstalk and Mismatch (CTM) signals representing CTM distortions caused by one or more output transmission signals of each the analog portion of the signal path;
predistort each of the input transmission signals in response to the respective input transmission signal and the respective CTM signal;
apply each of the predistorted input transmission signals to a respective one of the analog portion of the signal path.

* * * * *